United States Patent [19]

Diem et al.

[11] Patent Number: 4,814,422

[45] Date of Patent: Mar. 21, 1989

[54] PULVERULENT AMINOPLAST ADHESIVE RESIN FOR WOOD-BASE MATERIALS HAVING A LOW FORMALDEHYDE EMISSION, ITS PREPARATION, AND A FORMULATED PULVERULENT AMINOPLAST ADHESIVE RESIN

[75] Inventors: Hans Diem, Mannheim; Friedrich Kraus, Bensheim; Guenther Matthias, Frankenthal; Bruno Maurer, Dannstadt-Schauernheim; Otto Wittmann, Frankenthal, all of Fed. Rep. of Germany

[73] Assignee: BASF Aktiengesellschaft, Ludwigshafen, Fed. Rep. of Germany

[21] Appl. No.: 63,685

[22] Filed: Jun. 19, 1987

[30] Foreign Application Priority Data

Jun. 21, 1986 [DE] Fed. Rep. of Germany ....... 3620855

[51] Int. Cl.$^4$ .............................................. C08G 14/10
[52] U.S. Cl. ..................................... 528/230; 524/418; 524/419; 524/421; 524/542; 525/517; 525/934; 528/256; 528/263
[58] Field of Search ............... 524/418, 419, 421, 542; 525/517, 934, 230; 528/256, 263

[56] References Cited

U.S. PATENT DOCUMENTS 4,654,259  3/1987  Stofko .................................. 524/56
4,684,690  8/1987  Kraus et al. ......................... 524/419

Primary Examiner—John Kight
Assistant Examiner—Samuel A. Acquah
Attorney, Agent, or Firm—Keil & Weinkauf

[57] ABSTRACT

In the proposed pulverulent aminoplast adhesive resin for wood-base materials having a low formaldehyde emission, the resin is a mixture of
(a) from 40 to 90 parts by weight of a urea/formaldehyde resin having a molar ratio of urea to formaldehyde of from 1:1.4 to 1:2,
(b) from 2 to 20 parts by weight of melamine, some or all of which may have been reacted with the urea/-formaldehyde resin component,
(c) from 2 to 20 parts by weight of urea and
(d) if required, from 0.1 to 10 parts by weight of an agent for increasing the shelf life, together with not more than 10 parts by weight of water and, if required, not more than 10 parts by weight of other additives, the numbers of parts by weight of the components summing to 100.

In the process for the preparation of the pulverulent aminoplast adhesive resin, powdered melamine is stirred into a solution of the urea/formaldehyde resin, urea is added and the solution is spray dried. The aminoplast adhesive resins are suitable in the manufacture of particle board, plywood board and as paper adhesives.

6 Claims, No Drawings

PULVERULENT AMINOPLAST ADHESIVE RESIN FOR WOOD-BASE MATERIALS HAVING A LOW FORMALDEHYDE EMISSION, ITS PREPARATION, AND A FORMULATED PULVERULENT AMINOPLAST ADHESIVE RESIN

The present invention relates to a pulverulent aminoplast adhesive resin for wood-base materials having a low formaldehyde emission, in particular for the production of particle boards, for bonding surfaces or as a paper adhesive, a process for the preparation of the aminoplast adhesive resin, and a formulated aminoplast adhesive resin.

Adhesive resin powders are important when the transport costs for aqueous adhesive resin solutions are too high compared with the costs of spray drying. Over the past few years, low-formaldehyde adhesive resins have in general become increasingly important, in particular for the production of particle boards. The reason for this is that the pungent odor of formaldehyde causes a certain degree of inconvenience, and irritation occurs at higher concentrations. The preparation of low-formaldehyde amino resins in powder form in very difficult and has remained an unsolved problem to the present day. There are two reasons for this. Firstly, low-formaldehyde adhesive resin solutions contain components which adhere to the wall of the spray drier, melt, run down or adhere to the filters, block the latter and as a result soon produce a sharp pressure increase, resulting in interruption of production. However, even when this disadvantage is accepted, adhesion of the low-formaldehyde powder components leads to separation into formaldehyde-rich and low-formaldehyde components, and the objective, ie. a low formaldehyde content in the finished product, is not achieved. Mixing formaldehyde-rich with low-formaldehyde components, in the extreme case with urea, also does not lead to a resin powder which can be handled, since this mixture has a short shelf life and finally gives rise to solids which are difficult to dissolve. Another difficulty arises from the lack of adhesion of adhesive resins having a very low formaldehyde content. In the case of liquid resins, this problem is solved by special condensation techniques, by beginning the procedure at high formaldehyde contents, ie. high molar ratios of formaldehyde to urea, and reducing the molar ratio continuously during the condensation by stepwise addition of urea. In the case of fairly high requirements with regard to strength and resistance to swelling, the resin is modified with melamine. These resins, either modified or unmodified, are reacted with alcohols, it being assumed that some of the hydroxymethyl groups are etherified with elimination of water. For the above reasons, this stepwise reduction in the molar ratio is not feasible when the resin solution to be dried is subjected to spray drying. Drying all resin components of a melamine resin together also does not improve the situation.

It is an object of the present invention to provide a pulverulent aminoplast adhesive resin for wood-base materials having a low formaldehyde emission, and a process for the preparation of the said resin.

We have found that this object is achieved by a pulverulent aminoplast adhesive resin, wherein the resin is a mixture of
(a) from 40 to 90 parts by weight of a urea/formaldehyde resin having a molar ratio of urea to formaldehyde of from 1:1.4 to 1:2,
(b) from 2 to 20 parts by weight of melamine, some or all of which may have been reacted with the urea/formaldehyde resin component,
(c) from 2 to 20 parts by weight of urea and
(d) if required, from 0.1 to 10 parts by weight of an agent for increasing the shelf life,
together with not more than 10 parts by weight of water and, if required, not more than 10 parts by weight of other additives, the numbers of parts by weight of the components summing to 100.

In a preferred embodiment, the pulverulent aminoplast adhesive resin is a mixture of
(a) from 40 to 90 parts by weight of a urea/formaldehyde resin having a molar ratio of urea to formaldehyde of from 1:1.4 to 1:1.8,
(b) from 2 to 20 parts by weight of melamine,
(c) from 2 to 20 parts by weight of urea and
(d) if required, from 0.1 to 10 parts by weight of an agent
for increasing the shelf life, together with not more than 10 parts by weight of water and, if required, not more than 10 parts by weight of other additives.

In a particularly preferred embodiment, the urea/formaldehyde resin has a molar ratio of urea to formaldehyde of about 1:1.6.

In a particularly advantageous embodiment of the invention, the aminoplast adhesive resin contains agents for increasing the shelf life. The use of silica, in particular hydrophobic silica, as sold, for example, under the trade name Sipernat$^R$ D17, is particularly preferred for this purpose. The aminoplast adhesive resin particularly advantageously contains the silica in an amount of from 0.1 to 2, in particular from 0.5 to 1.5, parts by weight. The use of about 1 part by weight of Sipernat$^R$ D17 per 100 parts by weight of aminoplast adhesive resin is particularly preferred.

It has proven particularly advantageous for the pulverulent aminoplast adhesive resin to contain, as as additive, a soluble sulfite or bisulfite in an amount of from 0.2 to 2 parts by weight, based on the total amount of the resin components. This is particularly advantageously an alkali metal or ammonium sulfite or bisulfite. The sodium salt $Na_2SO_3$ is particularly preferably used. The amount of sulfite or bisulfite is preferably from 0.5 to 1, in particular about 0.7, part by weight, based on the total amount of the resin components. The sulfite or bisulfite can be added in powder form or in solution.

The addition of the sulfite or bisulfite results in a reduction in the viscosity of the solutions prepared from the adhesive resin powder, so that these solutions are easier to handle. Moreover, the miscibility of the aminoplast resin with water is increased; finally, in the preparation of the resin solution to be dried, and where sulfite or bisulfite is added, it is not necessary constantly to adjust the pH of the adhesive resin mixture during the addition of urea to the resin solution.

In the novel process for the preparation of the aminoplast adhesive resin, the melamine, in the form of a powder, is stirred into a solution of the urea/formaldehyde resin, urea is added and the solution is spray dried. The agent for increasing the shelf life can be mixed in directly after the spray drying procedure. In this case, the resin powder may still be warm. A separate mixing unit is not required since the agent for increasing the shelf life can be added, for example, in the filling plant for the aminoplast adhesive resin. The filling plant is downstream of the spray drier.

In a preferred embodiment of the novel process, the urea is added in the form of an aqueous solution to the solution of the urea/formaldehyde resin.

The novel process is particularly advantageous because only a single spray drying process is required for all components of the resin. Since separate drying of the components is avoided, separate storage of the dried components and subsequent mixing of these components, for which mixing apparatuses would be required, are also dispensed with. This saves personnel and, furthermore, special control of the mixing quality is unnecessary; such a control would be necessary if the components were dried separately, since mixing for too long is expensive and mixing for an insufficient time adversely affects the product quality.

The unconverted urea, which has a melting point of 131° C., would in principle be expected to adhere in the form of a grease to the hot wall of the spray drier and not to enter the filter. Surprisingly, this undesirable effect does not occur if melamine powder is added before spray drying of the urea/formaldehyde solution, after the addition of the urea, advantageously as urea solution. Apparently, the melamine prevents the urea from running down the tower wall of the spray drier in the form of a grease. This effect has not been observed to date. It is essential to the invention, since it permits the preparation of the novel aminoplast adhesive resin by the process according to the invention.

Melamine would in principle have been expected to cause the urea to melt more readily on the tower wall, since a depression of the melting point was to be expected from the outset. However, such a depression of the melting point obviously does not occur.

It was also to be expected that the urea fed in would react with the urea/formaldehyde resin, since the reaction rate of the resin is greatly increased at a drying tower temperature of well above 100° C.

Finally, it was not to be expected that large amounts of melamine would dissolve in the aqueous aminoplast adhesive resin. For example, 725 parts of melamine dissolve in 5053 parts of water and 5033 parts of dissolved resin (50% strength resin solution), giving a 15% strength aqueous melamine solution. In cold water, the solubility of melamine is less than 1%.

The novel process permits technically satisfactory spray drying with a capacity otherwise only observed in the case of pure urea resins without free urea.

The novel aminoplast adhesive resin permits the preparation of satisfactory particle boards having a low formaldehyde emission.

The present invention furthermore relates to a formulated pulverulent amininoplast adhesive resin containing a pulverulent aminoplast adhesive resin of the type defined above. A formulated pulverulent aminoplast adhesive resin of this type is already mixed with a curing agent and can be stored and delivered in this form, ready for use. If desired, the said formulated resin also contains a joint filler, for example a flour.

The present invention furthermore relates to a mixture of the aminoplast adhesive resin as defined above and other, conventional adhesives. The latter include, for example, organic adhesives of natural or synthetic origin.

The novel aminoplast adhesive resin or its mixtures can be used for the production of lignocellulosecontaining materials and, for example, also as a paper adhesive. This is an adhesive for paper, kraft paper, cardboard, corrugated board and similar materials.

The curing agent used in the formulated pulverulent aminoplast adhesive resin must be such that it does not react with the pulverulent resin mixture but effects curing only in the aqueous adhesive liquor of in the wood-base material, the particle board or the plywood board. Suitable curing agents can readily be selected from the known prior art curing agents. Particularly suitable examples of curing agents of this type are ammonium salts of strong inorganic acids, if necessary mixed with flours, starch, kaolin, highly condensed adhesive resins based on urea or melamine, powdered organic acids, such as maleic acid, fumaric acid, citric acid, tartaric acid or stearic acid, pulverized nutshells, coconut shells and olive stones.

The Examples which follow illustrate the invention.

EXAMPLE 1

A precondensate of 2,444.4 kg of 100% strength formaldehyde and 1,222.5 kg of solid urea, dissolved in 2,444.9 kg of water, was introduced into a stirred kettle reactor, and 1,210 kg of water and 1,000 l of 40% strength formaldehyde (=442.5 kg of 100% strength formaldehyde) were added. A further 1,820 l of a 68.9% strength urea solution (=1,455.0 kg of pure urea) were added, after which the solution was heated to 96° C. and left at this temperature for 10 minutes, and the pH was then brought to 6.4 with 10% strength formic acid. After a condensation time of about 45 minutes, a solution diluted 1:8 with water had a turbidity point of 15° C. During this time, the pH decreased to 5.1. Thereafter, a further 1,180 l of a 68.9% strength urea solution (=943.3 kg of pure urea) were added, and condensation was continued at pH 5.3 until a solution diluted 1:8 with water had a turbidity point of 42° C.

50.3 kg of $Na_2SO_3$ were dissolved in the solution, the pH reaching 9.8. Thereafter, 775 kg of melamine were stirred into the solution at 96° C. After about 2 minutes, the melamine had completely dissolved, the solution becoming milky.

After the addition of a further 1,020 l of 1 68.9% strength urea solution (=815.4 kg of pure urea), stirring was continue for a further 60 minutes at 90° C., the pH decreasing only slightly.

The solution was then cooled to 40° C. The solids content was 53.5% (determined by drying for 2 hours at 120° C.). No melamine was precipitated, although the solubility at 40° C. was exceeded.

After standing for 12 hours, the solution was spray dried. 1,253 kg/hour of powder having a residual moisture content of about 1% were obtained at a towerr outlet temperature of 93° C. The powder was mixed with 12.5 kg of Sipernat D17 directly after being discharged from the tower. The powder had a sodium sulfite content of 0.7%.

The 2:1 solution in water had the following properties:

pH: 8.6
viscosity at 20° C.: 1,250 mPas
gelling time at 70° C. with 10% of a curing agent in the form of form of 15% strength $NH_4Cl$ solution: 30 minutes.

662 parts of a mixture of 2 parts of this powder and 1 part of water were mixed with 66 parts of a 20% strength ammonium chloride solution and 72 parts of water to give a liquor. The gelling time of the liquor at 100° C. was 163 seconds. Spruce particles were mixed with an amount of liquor such that the binder/particle mixture contained 8% solid resin. The particles were pressed at 180° C. fo 4 minutes to give a particle board 18.2 mm thick.

The test gave the following results:
Density: 684 kg/n$^3$
Shear strength: 2.0 N/mm$^2$
Swelling after 2 hours: 24,2 %
Swelling after 24 hours: 28.5 %
Formaldehyde emision (FESYP): 5.3 mg of HCOH/100 g

EXAMPLE 2

A precondensate of 2,444.4 kg of 100% strength formaldehyde and 1,222.5 kg of solid urea, dissolved in 2,444.9 kg of water, was introduced into a stirred kettle reactor, and 1,210 kg of water, 232 1 of 25% strength ammonia water (=73.2 kg of pure ammonia) and 1,000 l of 40% strength formaldehyde (=442.5 kg of 100% strength formaldehyde) were added. A further 1,820 l of a 68.9% strength urea solution (=1,455.0 kg of pure urea) were added, after which the solution was heated to 90° C. and let at this temperature for 10 minutes, and the pH was then brought to 6.4 with 10% strength formic acid. After a condensation time of about 45 minutes, a solution diluted 1:8 with water had a turbidity point of 15° C. During this time, the pH decreased to 5.1. Thereafter, a further 1,180 l of a 68.9% strength urea solution (=943.3 kg of pure urea) were added, and condensation was continued at pH 5.3 until a solution diluted 1:8 with water has a turbidity point of 42° C.

The pH was then brought to 9.3 with 25% strength NaOH, and 775 kg of melamine were stirred into the solution at 96° C. After about 2 minutes, the melamine had completely dissolved, and the solution was stirred for 30 minutes at about 90° C. During this procedure, the solution became milky in appearance, the pH decreasing to about 7.6.

After the addition of a further 1,020 L of a 68.9% strength urea solution (=815 kg of pure urea), stirring was continued for a further 30 minutes at 85° C. During this procedure, the pH decreased to 7.0.

The solution was then cooled to 40° C. The solids content was 52.5% (determined by drying for 2 hours at 120° C.). No melamine was precipitated, although the solubility at 40° C. was exceeded.

After standing for 12 hours, the solution was spray dried. 1,253 kg/hour of powder having a residual moisture content of about 1% were obtained at a tower outlet temperature of 93° C. The powder was mixed with 12.5 kg of Sipernat D17 directly after being discharged from the tower.

The 2:1 solution in water had the following properties:
pH: 7.6
viscosity at 20° C.: 4,000 mPas
gelling time at 70° C. with 10% of a curing agent in the form of a 15% strength NH$_4$Cl solution: 32 minutes.

662 parts of a mixture of 2 parts of this powder and 1 part of water were mixed with 66 parts of a 20% strength ammonium chloride solution and 72 parts of water to give a liquor. The gelling time of the liquor at 100° C. was 163 seconds. Spruce particles were mixed with an amount of liquor such that the binder/particle mixture contained 8% solid resin. The particles were pressed at 180° C. for 4 minutes to give a particle board 18.2 mm thick.

The test gave the following results:
Density: 645 kg/m$^3$
Shear strength: 1.80 N/mm$^2$
Swelling after 2 hours: 26.7 %
Swelling after 24 hours: 30.9%
Formaldehyde emission (FESYP): 6 mg of HCOH/100 G OF
absolutely dry board.

We claim:

1. A process for the preparation of a pulverulent aminoplast adhesive resin which comprises:
   (a) stirring 2 to 20 parts by weight powdered melamine into a solution of 40 to 90 parts by weight of a urea/formaldehyde resin having a molar ratio of urea to formaldehyde of from 1:1.4 to 1:2;
   (b) adding to the solution from 2 to 20 parts by weight of urea, and
   (c) spraying-drying the resulting solution.

2. The process of claim 1 wherein the molar ratio of urea formaldehyde is from 1:1.4 to 1:.8.

3. The process of claim 1, wherein the molar ratio of urea formaldehyde is from 1:1.6.

4. The process of claim 1, wherein hydrophobic silica is added to the spray-dried solution as an agent for increasing the shelf life of the resin.

5. The process of claim 4, wherein the amount of hydrophobic silica that is added to the spray-dried solution is from 0.1 to 2 parts by weight.

6. The process of claim 1, wherein a soluble sulfite or bisulfite in the amount of from 0.2 to 2 parts by weight, based on the total amount of the resin components is added to the solution of urea/formaldehyde resin.

* * * * *